United States Patent [19]

Neumann

[11] 3,894,626

[45] July 15, 1975

[54] WORKPIECE TRANSFER MECHANISM

[75] Inventor: John W. Neumann, Birmingham, Mich.

[73] Assignee: Oxy Metal Finishing Corporation, Warren, Mich.

[22] Filed: May 21, 1973

[21] Appl. No.: 362,333

Related U.S. Application Data

[62] Division of Ser. No. 136,723, April 23, 1971, Pat. No. 3,760,453.

[52] U.S. Cl. ................................................. 198/25
[51] Int. Cl. ............................................... B41j 9/04
[58] Field of Search .......... 198/25, 184, 209, 20, 22

[56] References Cited
UNITED STATES PATENTS

| | | | |
|---|---|---|---|
| 2,813,615 | 11/1957 | Klein | 198/25 |
| 3,426,884 | 2/1969 | Donner | 198/25 X |
| 3,502,195 | 3/1970 | Benner | 198/25 |
| 3,592,334 | 7/1971 | Fleischauer | 198/184 |

Primary Examiner—Evon C. Blunk
Assistant Examiner—James M. Slattery
Attorney, Agent, or Firm—Harness, Dickey & Pierce

[57] ABSTRACT

An apparatus for handling workpieces and particularly cup-shaped articles, such as containers or the like, which travel at spaced intervals at high speed along a processing path. The transfer mechanism includes a movable member interposed in the path of travel of the workpieces and is movable laterally thereof for transferring the intercepted workpieces to an alternate path in which they may undergo additional processing. The movable member of the transfer device includes a cushioning member thereon for decelerating and absorbing the momentum of the workpieces impacting there against and further includes a suction member for releseably retaining the workpieces in transporting engagement on the movable member for at least a portion of their lateral transfer movement.

5 Claims, 14 Drawing Figures

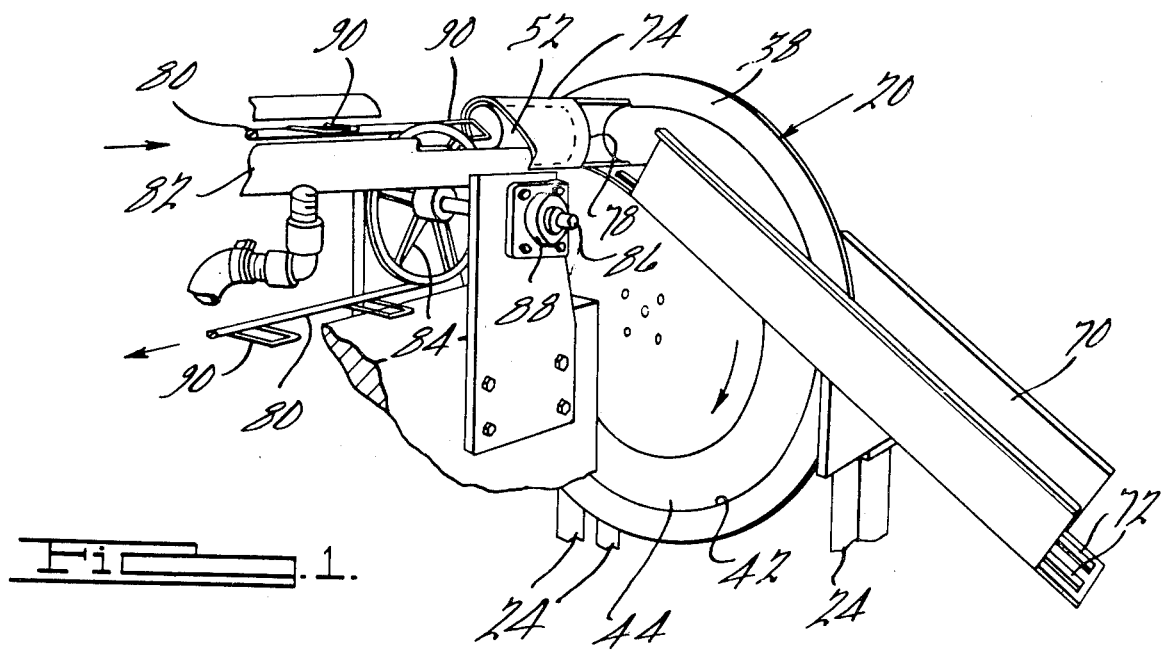
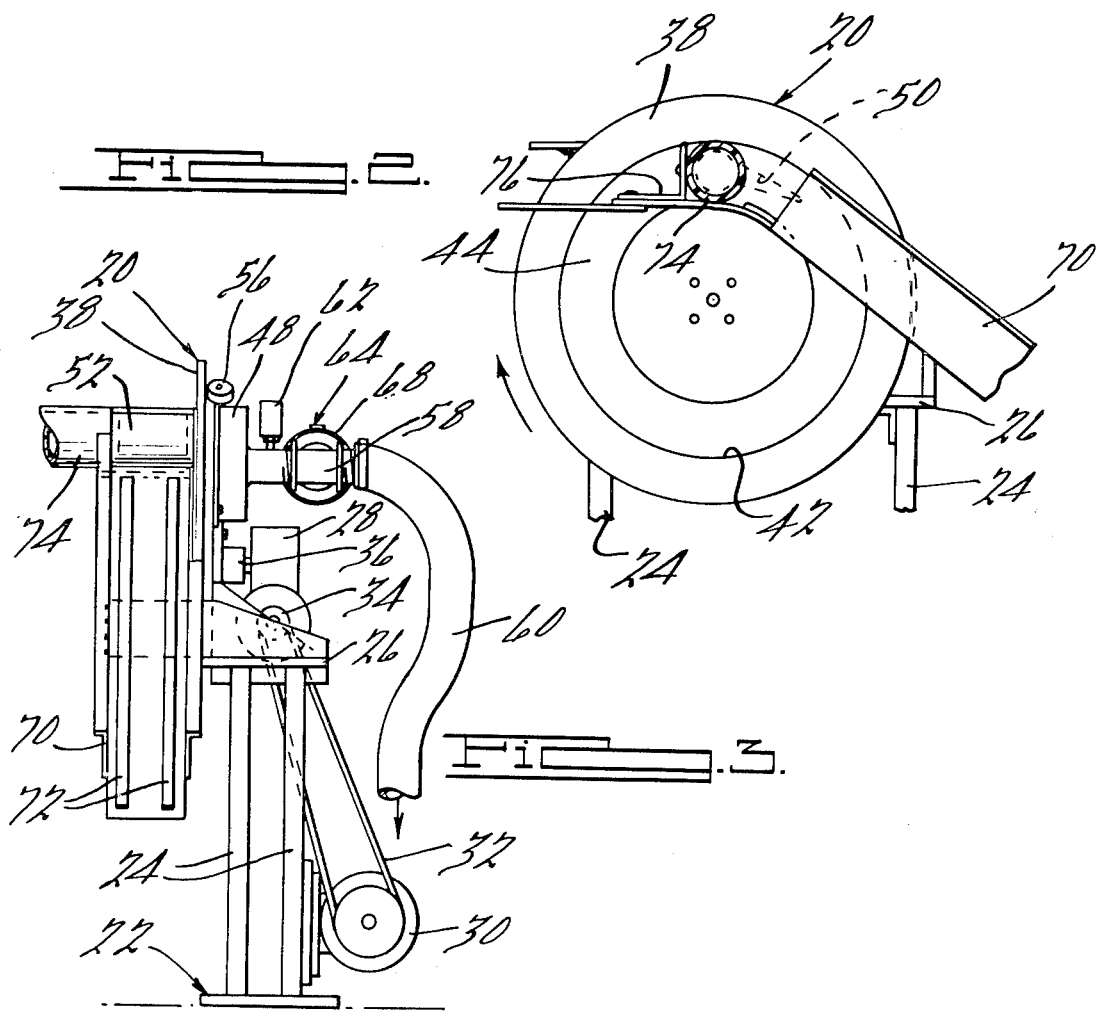

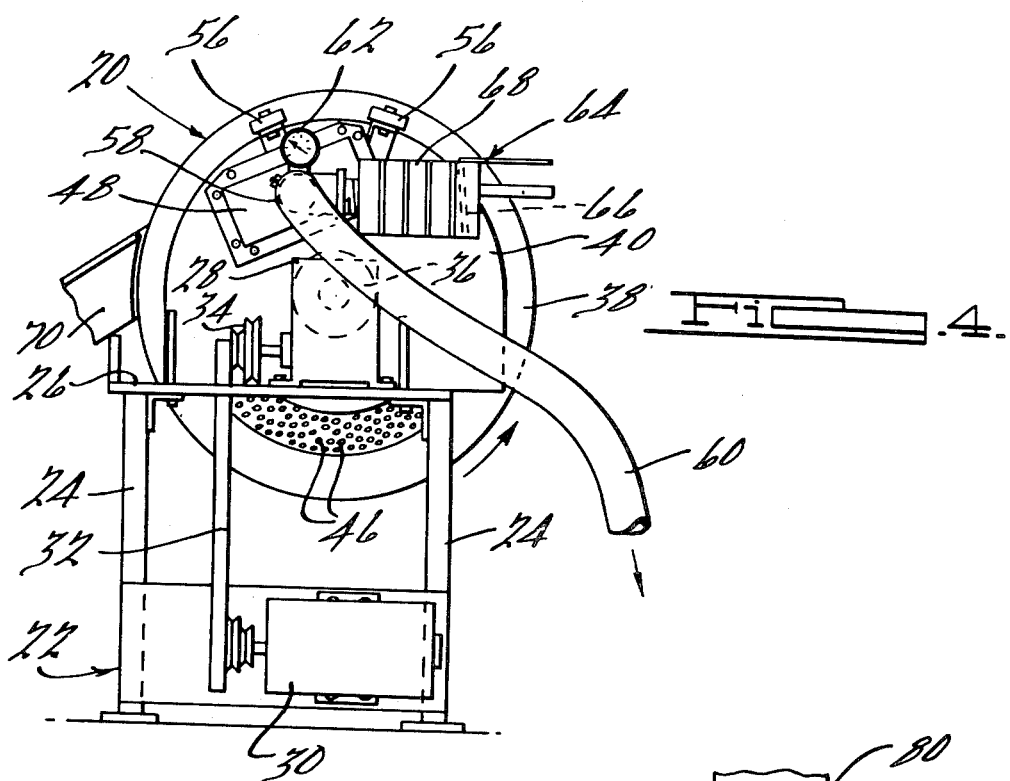
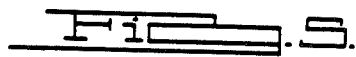
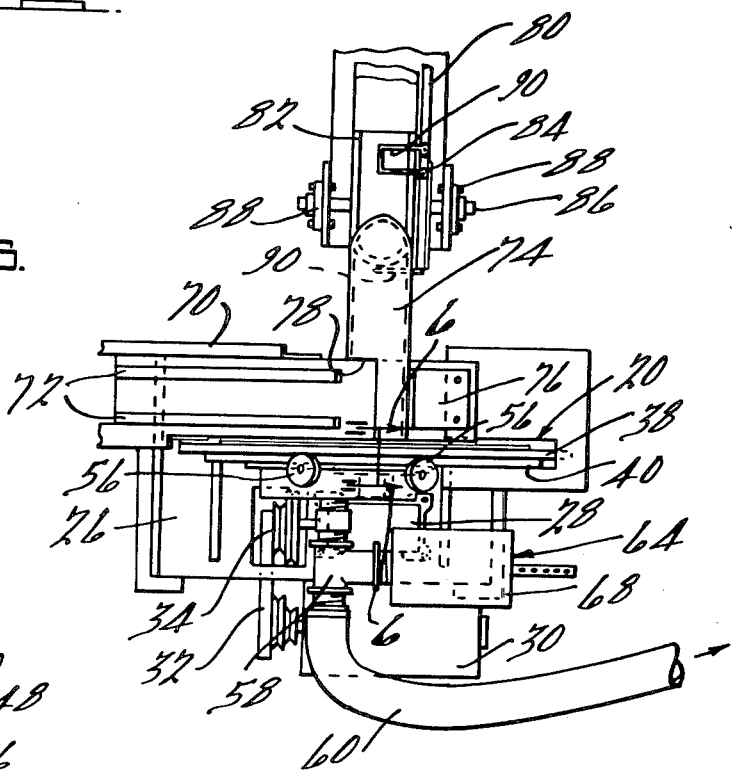
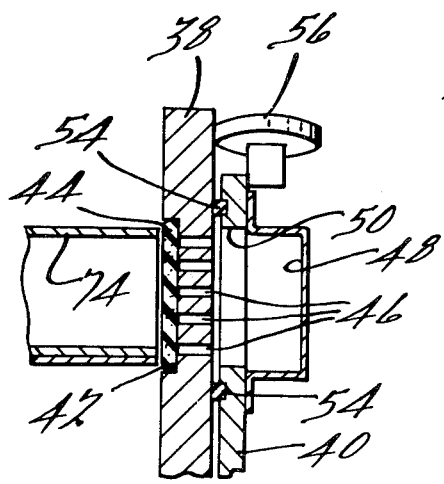
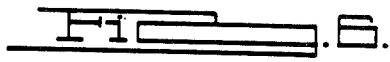

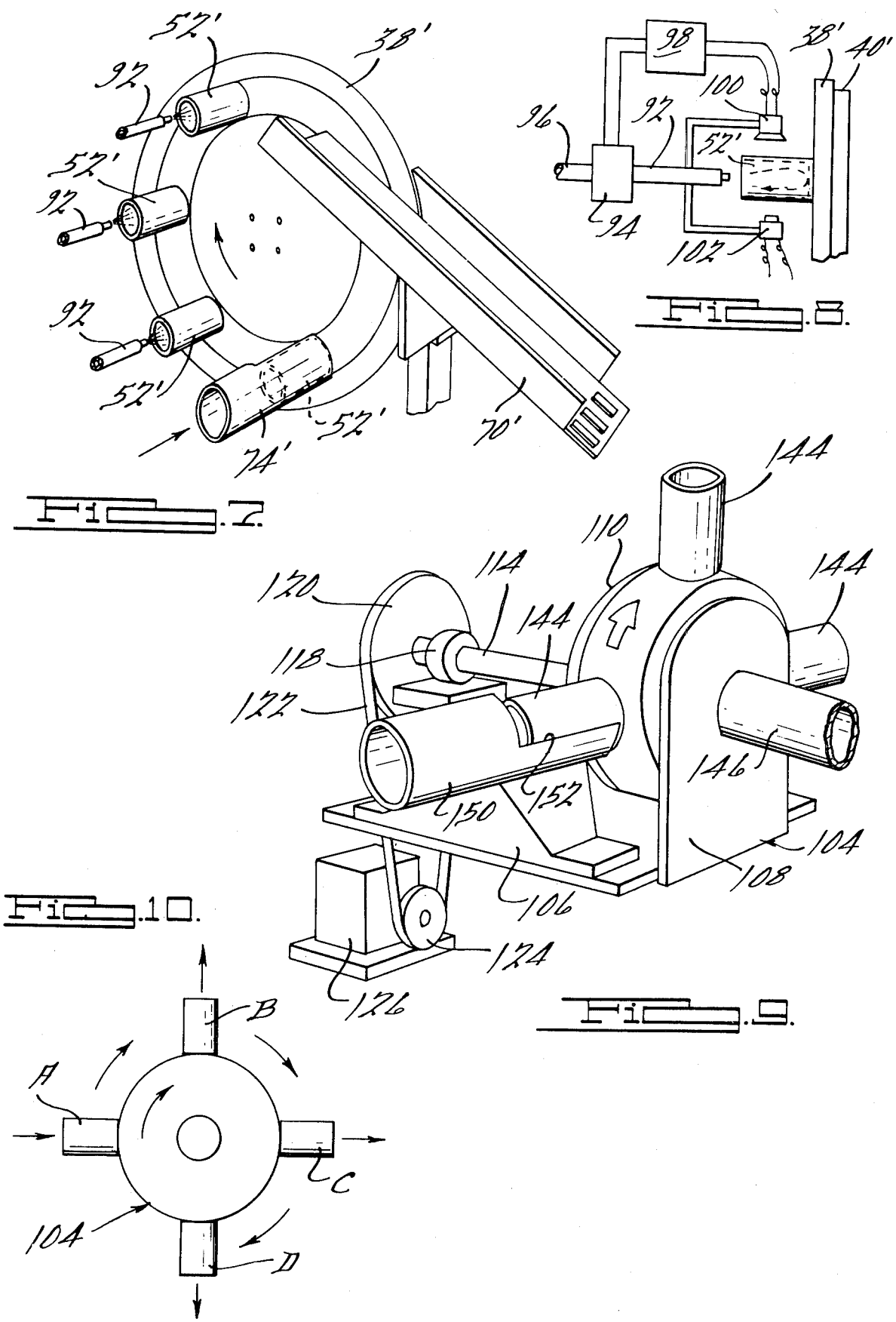

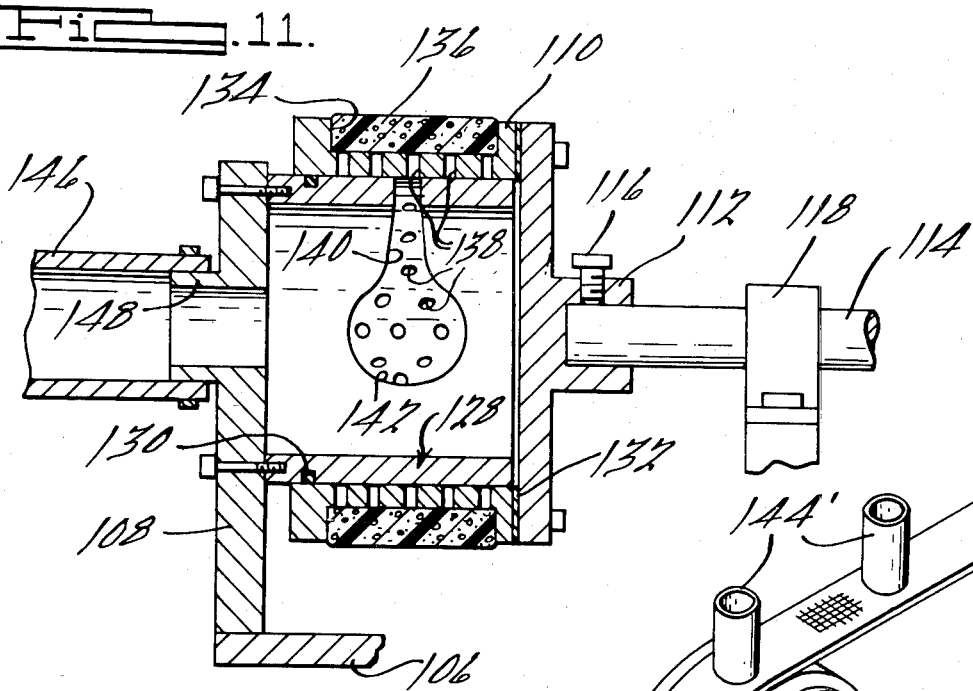
FIG. 11.
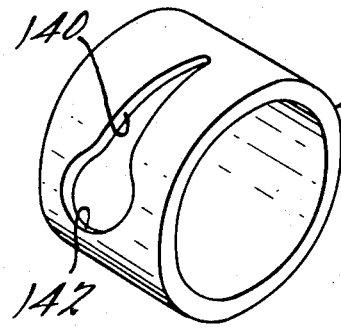
FIG. 12.
FIG. 13.
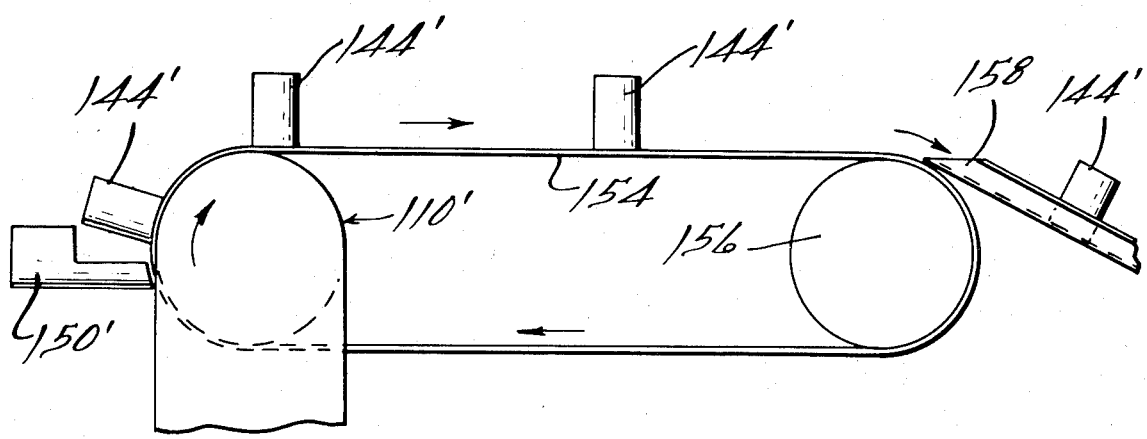
FIG. 14.

WORKPIECE TRANSFER MECHANISM

This is a division, of application Ser. No. 136,723, filed Apr. 23, 1971, now U.S. Pat. No. 3,760,453.

BACKGROUND OF THE INVENTION

Modern automatic manufacturing processes frequently require relatively sophisticated materials handling mechanisms to assure an uninterrupted flow of raw materials and finished products through the system. The present invention relates to a novel materials handling system which is particularly applicable but not necessarily restricted to the handling of cup-shaped workpieces such as containers of the types used in packaging beverages and other liquids for general consumption.

A workpiece processing system of the type to which the present invention is applicable is described in U.S. patent application Ser. No. 774,923, filed Nov. 12, 1968, now U.S. Pat. No. 3,664,354, for "Method and Apparatus for Processing Workpieces", which is assigned to the same assignee as the present invention. In the system and apparatus as described in the aforementioned application, workpieces of a generally elongated configuration are introduced into a confined stream flowing through a conduit. The workpieces become entrained in the fluid stream and are conveyed and simultaneously treated during their travel through the conduit. A plurality of such treatments can be successively effected by extracting and introducing the workpieces into separate conduits, each containing a fluid of the required treating characteristics.

In accordance with the foregoing arrangement, the workpieces, such as cup-shaped preliminarily formed containers suitable for packaging beverages and the like, travel longitudinally through the conduits at spaced intervals and at relatively high rates of speed. At one or more stages of the processing of such workpiece containers, it is necessary to change the orientation of the workpieces relative to their direction of travel such as from a position in which the longitudinal axis of the containers is disposed parallel to the direction of travel to a position in which the containers roll on their circular cylindrical periphery in a direction transverse to their longitudinal axes. Such a reorientation in the position and direction of travel of the workpieces may be required several times during the course of the processing cycle to attain optimum processing efficiency.

A continuing problem has heretofore been presented in providing a positive, simple and durable transfer device which is effective to change the position and direction of travel of workpieces moving at capacities of 600 per minute and greater without occasioning any damage or injury to such workpieces. This long-felt, heretofore unfilled need is supplied by the transfer mechanism of the present invention.

SUMMARY OF THE INVENTION

The benefits and advantages of the present invention are attained by a workpiece transfer mechanism comprising a guide defining a path along which workpieces, such as elongated metal containers, are adapted to travel at spaced intervals. A movable member is interposed in the path of travel of the workpieces and is movable laterally relative thereto for intercepting and laterally transferring the intercepted workpieces. The movable member is formed with a face having cushioning means thereon which is operable for effecting a rapid deceleration of the workpieces and for absorbing their momentum. Suction means are provided adjacent to the cushioning means for releaseably retaining the successively impacted workpieces in transporting engagement with the movable member for a predetermined increment of its travel, whereafter the workpieces are released and discharged into a suitable second guide for travel through supplemental processing steps as may be desired.

In accordance with one embodiments of the present invention, the movable member is in the form of a rapidly rotating disc for receiving and arcuately transferring successive workpieces to a tangentially oriented hopper or chute. In accordance with an alternative embodiment of the present invention, the movable member is in the form of a cylindrical drum rotatable about its longitudinal axis for arcuately transferring successive workpieces impacted thereon through a preselected angular increment, whereafter they are discharged into supplemental guide means. In accordance with still a further embodiment of the present invention, the workpieces while retained and transferred by the transfer device are subjected to supplemental processing, such as a drying or pretreatment, in preparation for the next process step.

Still further advantages and benefits of the present invention will become apparent upon a reading of the description of the preferred embodiment taken in conjunction with the accompanying drawings.

BRIEF DESCRIPTION OF THE DRAWINGS

FIG. 1 is a fragmentary perspective view of a rotary disc transfer device for handling cylindrically-shaped containers in accordance with one form of the present invention;

FIG. 2 is a fragmentary front elevational view of the transfer device shown in FIG. 1;

FIG. 3 is a fragmentary side elevational view of the transfer device shown in FIG. 1;

FIG. 4 is a rear elevation view of the transfer device shown in FIG. 1;

FIG. 5 is a fragmentary plan view of the transfer device and conveyor shown in FIG. 1;

FIG. 6 is a fragmentary transverse sectional view through a portion of the transfer device shown in FIG. 5 as taken substantially along the line 6—6 thereof;

FIG. 7 is a fragmentary perspective view of a modified form of the transfer device shown in FIG. 1 including the provision of nozzles for discharging a pressurized fluid against the workpieces during their transfer movement;

FIG. 8 is a fragmentary and partly diagrammatic side elevational view of sensing means operatively associated with a treating nozzle;

FIG. 9 is a fragmentary perspective view of a rotary drum transfer device in accordance with another embodiment of the present invention;

FIG. 10 is a diagrammatic side elevational view illustrating typical locations at which the workpieces can be disengaged from the transfer device shown in FIG. 9;

FIG. 11 is a fragmentary longitudinal vertical sectional view through the rotary drum transfer device shown in FIG. 9;

FIG. 12 is a perspective view of the baffle collar shown in FIG. 11;

FIG. 13 is a fragmentary perspective view of a foraminous belt on the rotary drum transfer device to effect disengagement and further conveyance of the workpieces impacted and engaged thereon; and FIG. 14 is a schematic side elevational view of the transfer device and belt arrangement shown in FIG. 13.

DESCRIPTION OF THE PREFERRED EMBODIMENTS

Referring now in detail to the drawings, and as may be best seen in FIGS. 1–6, inclusive, a rotary disc transfer device 20 is illustrated which is constructed in accordance with one of the embodiments of the present invention. The transfer device 20 comprises a framework 22 including upright leg portions 24 which are fastened at their upper ends to a platform 26 on which a speed reducer 28 is mounted. An electric motor 30 is fastened to the lower portion of the framework 22 and is drivingly coupled by means of a flexible belt 32 to a pulley 34 on the input shaft of the speed reducer 28.

The output shaft of the speed reducer 28 is provided with a hub 36 which is securely fastened to the center of a rotatable transfer disc 38 which overlies a backing plate 40 forming part of the framework. The forward face of the rotary transfer disc 38 is formed with an annular concentric groove 42 within which a cushioning material 44 is disposed. The transfer disc rearwardly of the cushioning material is of a foraminous construction, as best seen in FIGS. 4 and 6, comprising a plurality of ports 46 which are adapted to be disposed in communication with a suction manifold 48 which overlies a tapered port 50 formed through a portion of the backing plate 40. The port 50 and the manifold 48 extend for a preselected arcuate distance and are disposed in communication with the overlying section of the transfer disc for applying suction thereto. The suction force, acting through the porous cushioning material 44, operates on the workpieces such as the cylindrical closed end containers 52 which become impacted thereagainst, effecting a retention thereof in transporting engagement with the face of the transfer disc.

For this purpose, the cushioning material 44 preferably comprises an open-cell plastic foam, such as a polyurethane foam, to permit air flow from the forward face of the transfer disc through the ports into the suction manifold. In addition, the cushioning material is further characterized as being resilient and possessing impact absorption properties so as to effect a rapid deceleration of the containers 52 impacting thereagainst without producing any damage to the end surface thereof. The cushioning material also is selected to minimize any tendency of the containers to rebound out of engagement with the surface of the cushioning material. A variety of open-cell synthetic plastic foams can be used for this purpose which are commercially available and are selected to provide the desired impact and resiliency characteristics consistent with the speed, momentum and configuration of the workpieces being transferred.

In order to minimize channeling of air between the opposed faces of the backing plate and transfer disc, a pair of arcuate seals 54, as best seen in FIG. 6, are provided which extend in concentric relationship for substantially the length of the port 50.. The reduced pressure in the manifold 48 tends to draw the transfer disc firmly against the scals 54 and this movement is resisted by a pair of rollers 56 affixed to the backing plate and disposed in rolling bearing contact against the rear edge portion of the transfer disc.

Air is constantly withdrawn from the manifold 48 through a header conduit 58 projecting rearwardly thereof which in turn is connected to a flexible hose 60 that is adapted to be connected to the suction side of a suitable vacuum pump or blower (not shown). The header conduit 58, as best seen in FIG. 4, is provided with a gauge 62 for visually indicating the subatmospheric pressure present in the drum. An adjustable damper assembly 64 is provided for maintaining the pressure in the drum substantially constant in spite of variations in the number and locations of workpieces engaged by the transfer disc adjacent to the suction port 50. The damper assembly 64 is of a conventional type and is formed with an adjustable, resiliently-biased, pivotally mounted damper 66 disposed in closing relationship within the end portion of a damper chamber 68 and is operative to pivot, permitting the entrance of air into the header conduit when the pressure within the manifold decreases below a preselected level.

The configuration of the tapered port 50 is shown in dotted lines in FIG. 2. As seen, the port is formed with a generally circular enlarged section disposed in alignment with the point of impact of the containers so as to exert a maximum attractive force at this point. The suction port tapers in a clockwise direction, as viewed in FIG. 2, thereby reducing its effective area, whereby a decreasing attractive force is applied to the container engaged thereby as it is transferred in a lateral direction. The container, upon moving beyond the end of the port 50, is released from transporting engagement with the transfer disc and can thereafter be suitably engaged or guided such as by means of a chute 70 disposed in intercepting tangential relationship relative to the path of travel of containers on the disc.

The chute 70, as best seen in FIGS. 1 and 5, is of a generally U-shaped trough configuration and is formed with a pair of engaging strips 72 of a cushioning material for receiving and imparting a rolling motion to the containers entering the upper section thereof. The upstanding flanges of the chute 70 are spaced apart in clearance relationship relative to the ends of the container to impart directional guidance thereto.

Guided conveyance of the workpieces, such as the closedended containers 52, into impacting engagement against the face of the transfer disc can be achieved by any one of a variety of devices, including the output ends of preceding apparatuses from which the containers are discharged. In order to assure substantially perpendicular alignment of the longitudinal axis of a container with the cushioning material on the face of the transfer disc, a notched guide tube 74 is preferably provided which is securely fastened by means of an L-shaped bracket 76 to the framework. The guide tube 74 has an internal diameter greater than the diameter of the container, providing for sliding guidance therebetween. The guide tube terminates at a point spaced from the face of the cushioning material, as seen in FIG. 6, and is formed with an opening or notch 78 on the downstream or right-hand side, as viewed in FIG. 1. The notch 78 is of a length corresponding substantially to the length of the containers in order to enable unrestricted movement of the containers in an arcuate direction outwardly of the guide tube upon being engaged by the face of the transfer disc.

The delivery of workpieces into the inlet end of the guide tube 74 is controlled so that the workpieces are disposed in spaced intervals to permit sufficient time to elapse for transferring a workpiece laterally out of alignment with the guide tube before the next workpiece arrives. In accordance with the preferred construction as shown in FIGS. 1 and 5, appropriate longitudinal spacing is achieved by a flexible conveyor belt 80 having its upper flight extending longitudinally of a trough or guide rail 82 defining a path along which the containers 52 travel toward the transfer device. The conveyor belt 80 is trained around an idler pulley 84 supported on a shaft 86 rotatably mounted in bearings 88 such that the upper flight thereof parallels the longitudinal axis of the guide rail 82. The opposite end (not shown) is trained around a drive pulley driven at a controlled speed relative to the speed of the transfer disc. The conveyor belt is provided with a plurality of U-shaped fingers 90 secured at longitudinally spaced intervals therealong which are adapted to abut against the leading edges of the containers, maintaining them in appropriate longitudinal spacing. The flight of the conveyor belt and the fingers 90 thereon move downwardly immediately adjacent to the inlet of the guide tube which preferably is formed with a contour corresponding to the path of travel of the fingers.

In operation, the energization of the motor 30 effects a rotation of the transfer disc in a clockwise direction, as viewed in FIG. 1, while at the same time, a reduced atmospheric pressure is applied to the manifold 48, providing a suction force on the face of the transfer disc overlying the tapered port 50. Workpiece containers 52 traveling along the guide rail 82, as shown in FIG. 1, are advanced between the fingers 90 of the conveyor belt into the open inlet end of the guide tube 52 and become impacted against the cushioning material on the face of the disc. The point of impact corresponds to the enlarged end of the port 50, as best seen in FIG. 2. The end of the workpiece container is held by the suction forces against the face of the transfer disc in a manner illustrated in FIG. 3 and is transferred laterally during the continued rotation of the disc into the inlet side of the chute 70. During the container's traverse from a position in alignment with the output end of the guide tube and the inlet of the chute 70, the suction pressure against the head of the container is progressively lessened due to the reduced suction force applied thereto as a result of the tapering of the port 50. The containers roll downwardly along the chute 70, which in turn may be disposed in communication with secondary conveying means for transferring the workpieces through additional processing steps.

It is also contemplated within the scope of the present invention that the transfer device in addition to changing the direction of travel and orientation of workpieces, can also be employed for retaining the workpieces to permit the performance of a work operation thereon. A typical arrangement is illustrated in FIG. 7 wherein like parts to the disc-type transfer device previously described are designated by the same numeral with a prime affixed thereto. In the arrangement illustrated, the output end of the notched guide tube 74' is located approximately 270° from the inlet end of the chute 70'. This greater distance provides for a longer period of residency of the containers 52' on the transfer disc 38' to enable an increase in the duration of treatment. In the arrangement shown in FIG. 7, the containers 52' are securely retained on the face of the transfer disc by the suction applied to the ends thereof along their entire travel to the input end of the chute and is exemplary of one in which the containers 52' are being received from a preceding liquid treating step. The residual treating liquid remaining in the interior of the containers is substantially completely removed by directing high pressure air blasts into their open end by jet nozzles 92 located along the path of transfer of the containers.

The jet nozzles can be operated continuously or on an intermittent basis in accordance with the arrangement shown in FIG. 8 in response to the presence of a container as sensed by suitable sensing means. As shown in FIG. 8, the jet nozzle 92 is provided with a solenoid valve 94 which is connected to a supply line 96 disposed in communication with a source of high pressure air. Actuation of the solenoid valve 94 is achieved by a control circuit diagrammatically indicated by 98 which is electrically connected to an optical scanner 100 disposed in opposed alignment with a light source 102. The interruption of the light beam by the container 52' signals the control circuit 98 which in turn permits a short duration blast of high pressure air to enter the interior of the container in a sweeping direction as indicated by the arrow, effecting dislodgement and removal of any residual droplets of treating liquid.

An alternative satisfactory transfer mechanism comprises a rotary drum transfer device 104, as shown in FIGS. 9 through 12 of the drawings. As shown, the drum transfer device comprises a framework including a base 106 formed with an upright end member 108 adjacent to which a foraminous drum 110 is rotatably mounted. As best seen in FIG. 11, the drum 110 is secured at one end thereof to a circular flange formed on a hub 112 which is affixed to the end of a shaft 114 such as by means of a set screw 116. The shaft 114 is rotatably journaled in pillow blocks 118 mounted on the framework and a pulley 120 is affixed to the opposite end thereof. A flexible drive belt 122 extends around the pulley 120 and is drivingly connected to drive pulley 124 of a motor 126 for effecting a rotation of the drum.

Stabilization of the drum 110 during its rotation is achieved by the sliding coaction between the inner surface of the drum and the periphery of a cylindrical baffle 128, which is stationarily secured such as by means of screws to the end member 108. The interior of the baffle 128 defines a chamber of manifold which is adapted to be partially evacuated for the purpose of applying a suction force to the peripheral face of the drum for the same purposes described in connection with the rotary disc transfer device. In order to minimize channeling of air into the interior of the baffle, an annular seal 130 is provided around the baffle and a gasket 132 is positioned between the hub flange and drum edge.

The drum is formed with an encircling rectangular-shaped groove 134, within which a cushioning material 136 is disposed having the same characteristics as the cushioning material 44 previously described. The drum, in the area along the base of the groove 134, is formed with a plurality of ports 138 which are adapted to overlie an elongated suction port 140 formed in the baffle. As best seen in FIG. 12, the elongated suction port is formed with an enlarged circular portion 142, which is adapted to be disposed in alignment with the point of impact of cylindrical workpieces, such as containers 144, and thereafter progressively tapers to provide a decreasing suction force as the container moves in an arcuate direction relative thereto.

The formation of a subatmospheric pressure within the interior of the drum is achieved by a hose 146 having one of its ends connected to a suitable vacuum pump and the opposite end thereof connected to a nipple 148 mounted on the outer face of the end member as shown in FIG. 12.

The specific size, orientation and configuration of the suction port 140 will vary depending on the particular configuration of the workpiece, the point of impact on the drum and the desired angular increment of the transfer movement. Typical alternatives are diagrammatically illustrated in FIG. 10, whereby a container, indicated at A, impacts against the periphery of the rotary drum transfer device 104 and is arcuately transferred in a clockwise direction and can be selectively removed at positions B, C or D as may be desired. The orientation and guidance of the workpieces into contact with the face of the drum is achieved in a manner similar to that previously described utilizing a guide tube 150 which is notched as at 152 of FIG. 9 to permit upward arcuate movement of the containers 144 upon coming in contact with the face of the drum.

One manner in which the workpieces can be removed at a selected location from the face of the drum is illustrated by the arrangement shown in FIGS. 13 and 14. As shown, an endless, flexible foraminous belt 154 is trained around the periphery of a drum 110' and extends tangentially therefrom and is trained around an idler drum 156. The containers 144' enter through the guide tube 150' and are retained by the suction force present at the face of the drum until the belt disengages itself from the drum surface, whereafter the containers travel longitudinally until they are received in a suitable takeoff chute 158.

The rotary disc transfer mechanism and rotary drum transfer mechanism, in addition to effecting a deceleration and a change in the direction and orientation of the workpieces, can also be employed for effecting further treatment of the workpieces during the transfer movement thereon. In addition to the foregoing, the transfer mechanisms can be employed for positioning, sorting, spacing and dispatching workpieces along selected paths of travel to provide a desired processing sequence. It will also be appreciated that the axes of rotation of the disc and drum can be varied as may be required to attain optimum performance in any given situation.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A workpiece transfer mechanism comprising guide means defining a path along which workpieces are adapted to travel at spaced intervals, transfer means including a rotatable foraminous drum mounted for rotation about an axis transverse to the path of travel of the workpieces and interposed in said path for intercepting successive workpieces traveling along said path, said rotatable foraminous drum formed with a workpiece receiving face having cushioning means thereon for absorbing the momentum of workpieces impacting thereagainst, suction means for releaseably retaining successively impacted workpieces in transporting engagement with said rotatable foraminous drum including a baffle stationarily disposed within said drum and having an annular slot of decreasing cross sectional area for applying a progressively decreasing suction to workpieces impacted against said receiving face on moving from the point of impact of the workpieces to a point angularly spaced therefrom, and receiving means for receiving workpieces intercepted and transferred by said rotatable foraminous drum.

2. The transfer mechanism as defined in claim 1, wherein the workpieces comprise cup-shaped containers having at least one end thereof closed and oriented with said end toward said face.

3. The transfer mechanism as defined in claim 1, further including means along said guide means for maintaining the workpieces in appropriate spaced intervals along said path.

4. The transfer mechanism as defined in claim 1, wherein and said cushioning means comprises a resilient open-cell cellular foam disposed in overlying relationship on said rotatable foraminous drum.

5. The transfer mechanism as defined in claim 1, wherein said receiving means comprises an endless foraminous element trained around said face of said drum and extending in a direction tangentially thereof.

* * * * *